US011662703B1

(12) United States Patent
Shao et al.

(10) Patent No.: US 11,662,703 B1
(45) Date of Patent: May 30, 2023

(54) INDUSTRIAL INTERNET OF THINGS FOR INSPECTION DATA PROCESSING, CONTROL METHOD, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Junyan Zhou, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/813,019

(22) Filed: Jul. 15, 2022

(30) Foreign Application Priority Data

Jun. 10, 2022  (CN) .......................... 202210651128.9

(51) Int. Cl.
*G05B 19/042* (2006.01)

(52) U.S. Cl.
CPC ................. *G05B 19/0428* (2013.01)

(58) Field of Classification Search
CPC . G05B 19/0428; H04L 67/025; H04L 67/125; G16Y 40/30; G16Y 40/60; G06T 1/0014
See application file for complete search history.

(56) References Cited

U.S. PATENT DOCUMENTS

| 2015/0019714 | A1 | 1/2015 | Shaashua et al. |
| 2017/0111333 | A1 | 4/2017 | Smith et al. |
| 2019/0089788 | A1* | 3/2019 | Shao ............... H04L 67/125 |
| 2019/0210217 | A1* | 7/2019 | Jetté ............... B25J 11/005 |

(Continued)

FOREIGN PATENT DOCUMENTS

| CN | 102567611 A | 7/2012 |
| CN | 106817417 A | 6/2017 |
| CN | 107659636 A | 2/2018 |

(Continued)

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Thomas C Lee
*Assistant Examiner* — Michael Tang
(74) *Attorney, Agent, or Firm* — Metis IP LLC

(57) ABSTRACT

The embodiment of the present disclosure provides an Industrial Internet of Things for inspection data processing, comprising a management platform. The management platform is configured to perform operations including: determining an inspection task, the inspection task including detecting at least one detection site; sending instructions to an inspection robot based on the inspection task to move the inspection robot to a target position to be inspected; obtaining detection data based on the inspection robot, and determining subsequent detection or processing operations based on the detection data.

8 Claims, 6 Drawing Sheets

(56) References Cited

U.S. PATENT DOCUMENTS

2019/0273783 A1* 9/2019 Shao .................. G06Q 50/26

FOREIGN PATENT DOCUMENTS

| | | | | | |
|---|---|---|---|---|---|
| CN | 107770249 | A | | 3/2018 | |
| CN | 108074155 | A | | 5/2018 | |
| CN | 108615325 | A | | 10/2018 | |
| CN | 108717765 | A | | 10/2018 | |
| CN | 110392087 | A | | 10/2019 | |
| CN | 110570116 | A | | 12/2019 | |
| CN | 111844054 | A | * | 10/2020 | |
| CN | 112016820 | A | * | 12/2020 | ......... G06Q 10/0631 |
| CN | 112187835 | A | | 1/2021 | |
| CN | 112187836 | A | | 1/2021 | |
| CN | 112213979 | A | * | 1/2021 | |
| CN | 112946779 | A | | 6/2021 | |
| CN | 113259484 | A | | 8/2021 | |
| CN | 114449023 | A | | 5/2022 | |
| CN | 114548440 | A | | 5/2022 | |
| CN | 114612262 | A | | 6/2022 | |
| CN | 114615304 | A | | 6/2022 | |

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
Shao, Zehua et al., Perception and Control of Gas Abnormity of IoT Intelligent Gas Meters, Gas & Heat, 2020, 5 pages.
First Office Action in Chinese Application No. 202210651128.9 dated Jul. 18, 2022, 21 pages.

* cited by examiner

INDUSTRIAL INTERNET OF THINGS FOR INSPECTION DATA PROCESSING, CONTROL METHOD, AND STORAGE MEDIUM THEREOF

CROSS-REFERENCE TO RELATED APPLICATIONS

This application claims priority to Chinese Patent Application No. 202210651128.9, filed on Jun. 10, 2022, the contents of which are hereby incorporated by reference to its entirety.

TECHNICAL FIELD

The present disclosure generally relates to intelligent manufacturing technology, in particular, to Industrial Internet of Things for inspection data processing, control method, and storage medium thereof.

BACKGROUND

In some special workshops and plants, such as hazardous chemicals processing workshop, flammable and explosive materials manufacturing workshop, nuclear power plant equipment room and other special areas, the special environment makes the area very prone to accidents due to leakage, explosion, diffusion, and so on. Therefore, robots are usually used to perform corresponding operations in high-risk areas of such high-risk industries. The most common robot is the inspection robot.

The inspection robot carries out inspection through the inspection command issued in advance and the specified path. During inspection, it will pass through several detection sites. The inspection robot performs corresponding data monitoring at each detection site based on the inspection command, such as environmental or equipment temperature monitoring, gas concentration monitoring, dust concentration monitoring, radiation monitoring, etc., and sends the detection data to relevant systems or departments for circular data monitoring, so that manual detection is not required, and casualties caused by accidents can be avoided.

In the prior art, the inspection robot may need to set up multiple inspection electrical components or multiple inspection robots to conduct inspection according to the interval time during inspection, which leads to a large number of different types of data interaction during inspection and may also receive commands and send command execution results at any time. Therefore, both the inspection robot and its supporting data processing system need a large amount of data processing and storage, and all kinds of data in the existing technology need to be classified, which makes the data processing more cumbersome, affects the subsequent data analysis and call, and affects the subsequent processing flow and time. As a result, the existing inspection robot and its supporting data processing system are not only complex and difficult to build, but also expensive, which are unable to be better popularized and promoted.

SUMMARY

One of the embodiments of the present disclosure provides an Industrial Internet of Things for inspection data processing, comprising a management platform. The management platform is configured to perform operations including: determining an inspection task, the inspection task including detecting at least one detection site; sending instructions to an inspection robot based on the inspection task to move the inspection robot to a target position to be inspected; obtaining detection data based on the inspection robot, and determining subsequent detection or processing operations based on the detection data.

One of the embodiments of the present disclosure provides an Industrial Internet of Things for inspection data processing. The Industrial Internet of Things further comprises a user platform, a service platform, a sensor network platform, and an object platform; the user platform, the service platform, the management platform, the sensor network platform, and the object platform are interacted sequentially from top to bottom. The service platform and the sensor network platform adopt independent layout, and the management platform adopts front sub platform layout. The independent layout means that the service platform or the sensor network platform is provided with a plurality of independent sub platforms, the plurality of independent sub platforms respectively store, process, and/or transmit data of different lower platforms. The front sub platform layout means that the management platform is provided with a general platform and a plurality of sub platforms, the plurality of sub platforms respectively store and process data of different types or different receiving objects sent by the different lower platforms, and the general platform stores and processes data of the plurality of sub platforms after summarizing, and transmits the data of the plurality of sub platforms to upper platforms. The object platform is configured as the inspection robot in an intelligent production line. The control method includes: when the inspection robot inspects the detection site, obtaining detection data of equipment or environment corresponding to the detection site, associating identification information of the detection site with the detection data, packing the associated detection data into a detection package, and sending the detection package to a sub platform of the sensor network platform corresponding to the detection site; and receiving the detection packet, converting the detection packet into a data file recognized by the management platform, and sending the data file to a sub platform of the management platform corresponding to the detection site by the sub platform of the sensor network platform; receiving the data file, extracting the detection data in the data file for comparison, obtaining a comparison result, storing identification information of the detection site, the detection data, and the comparison result, and uploading them to the general platform of the management platform by the sub platform of the management platform; after receiving corresponding data, based on the comparison result, the general platform of the management platform executes: sending feedback instructions to corresponding sub platform of the management platform by the general platform of the management platform, sending the feedback instructions to the inspection robot through corresponding sub platform of the sensor network platform by the corresponding sub platform of the management platform, and continuing to perform detection after the inspection robot receiving the feedback instructions; or the general platform of the management platform executes: sending the identification information of the detection site, the detection data, and the comparison result to corresponding sub platform of the service platform by the general platform of the management platform; receiving the corresponding data and sending the corresponding data to the user platform by the corresponding sub platform of the service platform, and sending processing instructions based on the corresponding data to the corresponding sub platform of the service platform, the general platform of the management platform, corresponding sub platform of the management platform and corresponding sub platform of the sensor network platform by the user platform; and receiving the processing instructions and converting the processing instructions into an instruction file recognized by the inspection robot by the corresponding sub platform of the sensor network platform, and receiving the instruction file and performing corresponding processing operations by the inspection robot.

One of the embodiments of the present disclosure provides non-transitory computer-readable storage medium, which stores computer instructions, when the computer reads the computer instructions in the storage medium, the computer runs the control method of an Industrial Internet of Things for inspection data processing described in any one of the above items.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein.

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, components, parts or assemblies at different levels. However, if other words serve the same purpose, they may be replaced by other expressions.

As shown in the description and claims, the words "one", and/or "this" do not specifically refer to the singular, but may also include the plural, unless the context clearly indicates exceptions. Generally speaking, the terms "include" and "comprise" only indicate that the steps and elements that have been clearly identified are included, and these steps and elements do not constitute an exclusive list. Methods or equipment may also contain other steps or elements.

A flowchart is used in the present disclosure to explain the operation performed by the system according to the embodiment of the present disclosure. It should be understood that the preceding or subsequent operations are not necessarily performed accurately in sequence. Instead, you can process the steps in reverse order or simultaneously. At the same time, you can add other operations to these procedures, or remove one or more operations from these procedures.

The application scenarios of the Industrial Internet of Things (IoT) for inspection data processing may include processing devices, networks, storage devices, and inspection robots. The processing device may process information and/or data related to the application scenario of the Industrial Internet of Things for inspection data processing, and the management platform may be implemented in the processing device. The network may realize the communication of various components in the application scenario. A storage device may store data, instructions, and/or any other information. The inspection robot may receive the instructions from the management platform and perform the inspection task based on the instructions to inspect the industrial production environment or equipment.

Figure 1:
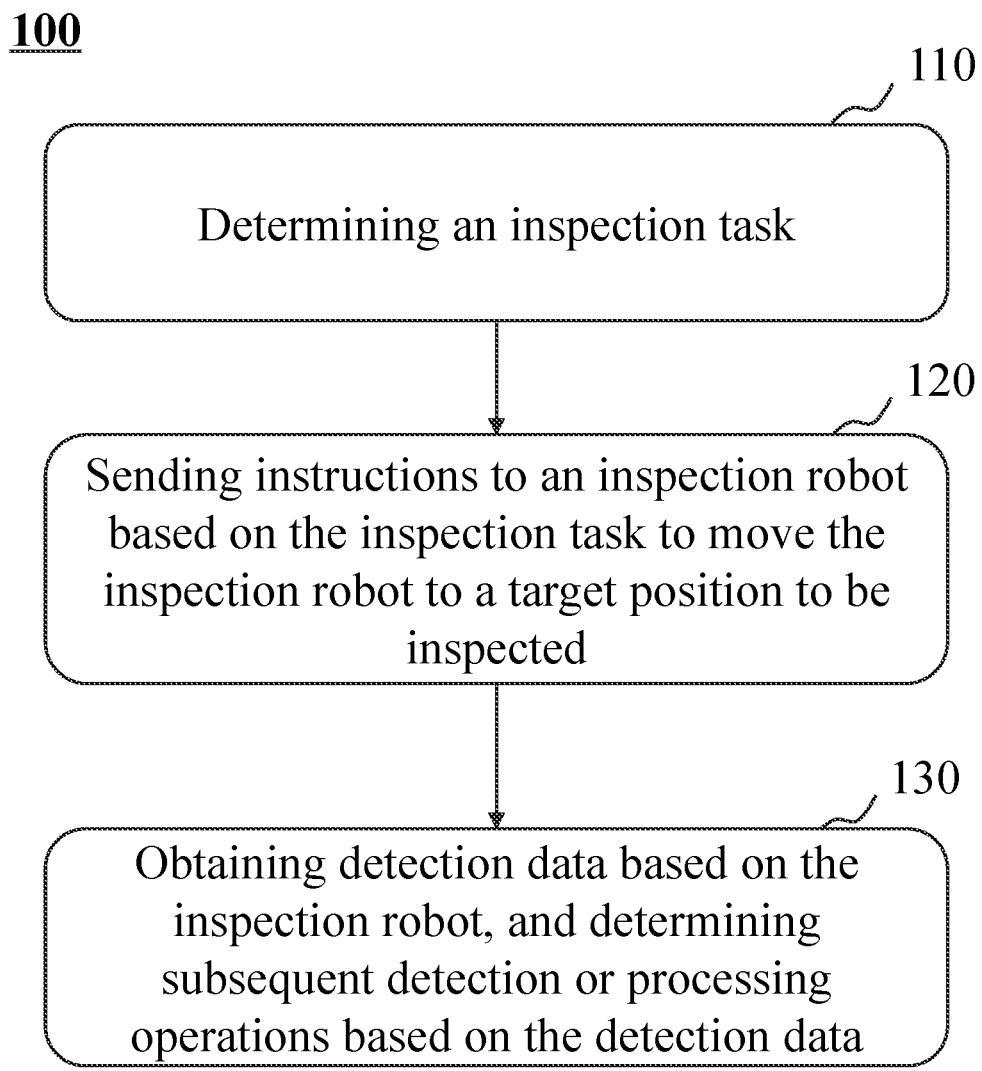
FIG. 1 shows an exemplary flowchart of an Industrial Internet of Things for inspection data processing according to some embodiments of the present disclosure.

FIG. 1 shows an exemplary flowchart of an Industrial Internet of Things for inspection data processing according to some embodiments of the present disclosure. In some embodiments, the process 100 may be executed by the management platform. As shown in FIG. 1, the process 100 includes the following steps.

In step 110, determining an inspection task.

The inspection task refers to a task of detecting at least one detection site and obtaining detection data. The at least one detection site may refer to sites in the inspection task where inspection is required and the detection data is obtained. The at least one detection site may have identification information. For example, the identification information of a detection site may include number information of the detection site (e.g., a No. 1 detection site, a No. 2 detection site) and position information of the detection site (e.g., three-dimensional coordinates). In some embodiments, the inspection of the at least one detection site may be completed by an inspection robot. The detection data may refer to data obtained by detecting equipment or environment corresponding to the detection site. For example, the detection data of the detection site may include temperature, humidity, air pressure, etc. of the environment corresponding to the detection site, and operation statuses (normal or abnormal) of the equipment corresponding to the detection site.

In some embodiments, the inspection task may be determined by obtaining an input from a manager. For example, contents to be detected (detection sites, required detection data, etc.) may be determined and uploaded to the management platform by the manager, and the management platform may generate corresponding inspection tasks.

In step 120, sending instructions to an inspection robot based on the inspection task to move the inspection robot to a target position to be inspected.

Positions to be inspected may refer to detection positions that have not been detected in this inspection task. For example, the inspection task may be a task that detects the No. 1 detection site, the No. 2 detection site, and a No. 3 detection site and obtains the detection data. Before the management platform sends instructions to the inspection robot, the No. 1 detection site, the No. 2 detection site and the No. 3 detection site may be the positions to be inspected. The target position to be inspected may refer to a position to be inspected which the inspection robot will go.

The instructions may be used to control the inspection robot to go to the target position to be inspected for detection. For example, contents of the instructions may include number information and position information of the detection site corresponding to the target position to be inspected which the inspection robot is required to go.

In some embodiments, the management platform may determine the target position to be inspected based on the number information of the detection site in the inspection task, thereby determining the instructions. For example, the management platform may determine a detection site with lowest number corresponding to number information in the inspection task as the target position to be inspected. For example, the inspection task may be to detect the No. 1 detection site, the No. 2 detection site, and the No. 3 detection site and obtain the detection data. The management platform may determine the No. 1 detection position as the target position to be inspected and send instructions to the inspection robot to go to the target position to be inspected for inspection.

In some embodiments, when the management platform sends the instructions to the inspection robot to move the inspection robot to a position to be inspected and obtain detection data of the detection site corresponding to the position to be inspected, the management platform may remove the detection site from the position to be inspected of the inspection task and mark it as an inspected position.

In some embodiments, the management platform may determine the target position to be inspected based on a current position of the inspection robot, thereby determining the instructions.

The current position of the inspection robot may be expressed in various ways, such as three-dimensional coordinates. The management platform may obtain a current position of the inspection robot through one or more position sensors deployed on the inspection robot or other methods.

In some embodiments, the management platform may determine the target position to be inspected based on distances between the current position of the inspection robot and at least one position to be inspected. For example, the current position of the inspection robot may be (0, 0, 0). The positions to be inspected in the inspection task may include the No. 1 detection position, the No. 2 detection position, and the No. 3 detection position. The three positions to be inspected may be located at (5, 0, 0), (10, 0, 0), (3, 0, 0). Through calculation, it may be concluded that the No. 3 detection position is the closest to the current position of the inspection robot, so the No. 3 detection position is determined as the target position to be inspected.

In some embodiments of the present disclosure, based on the current position of the inspection robot, the target position to be inspected may be determined by the positions to be inspected closest to the current position, which can effectively reduce the length of the inspection robot's moving path, reduce the situation such as detour, and improve the inspection efficiency.

In some embodiments, the management platform may determine the target position to be inspected based on a reinforcement learning model. In the reinforcement learning model, a reward value of the inspection robot performing an action in the reinforcement learning model may be related to a distance between the current position of the inspection robot and the target position to be inspected. For more information about the reinforcement learning model, determining the target position to be inspected based on the reinforcement learning model, and the reward value, please refer to FIG. 4 and its related descriptions.

In step 130, obtaining detection data based on the inspection robot, and determining subsequent detection or processing operations based on the detection data.

In some embodiments, the management platform may obtain the detection data based on the inspection robot and send detection data of the detection site to an internal research and judgment system. The internal research and judgment system may be an internal system of the management platform for research and judgment of the detection data. The internal research and judgment system may automatically research and judge the detection data based on preset rules to determine the subsequent detection or processing operations. For example, the internal research and judgment system may judge that the detection data is normal (for example, it meets standards in the preset rules) and upload research and judgment results to the management platform. The management platform may send instructions to the inspection robot based on the research and judgment results, so that the inspection robot may move to the positions to be inspected in the inspection task to perform a next detection. The management platform may determine instructions based on the above manner in step 120.

In some embodiments, if there is no position to be inspected in current inspection task, the inspection robot may send receipt information of task completion to the management platform and return to a starting position (or stand by in place), waiting for a next inspection task.

In some embodiments, the management platform may determine a comparison result based on the detection data of the detection site and a detection data comparison table, and determine subsequent operations based on the comparison result. For more information about the detection data comparison table and the comparison result, please refer to FIG. 3 and its related descriptions.

Figure 2:
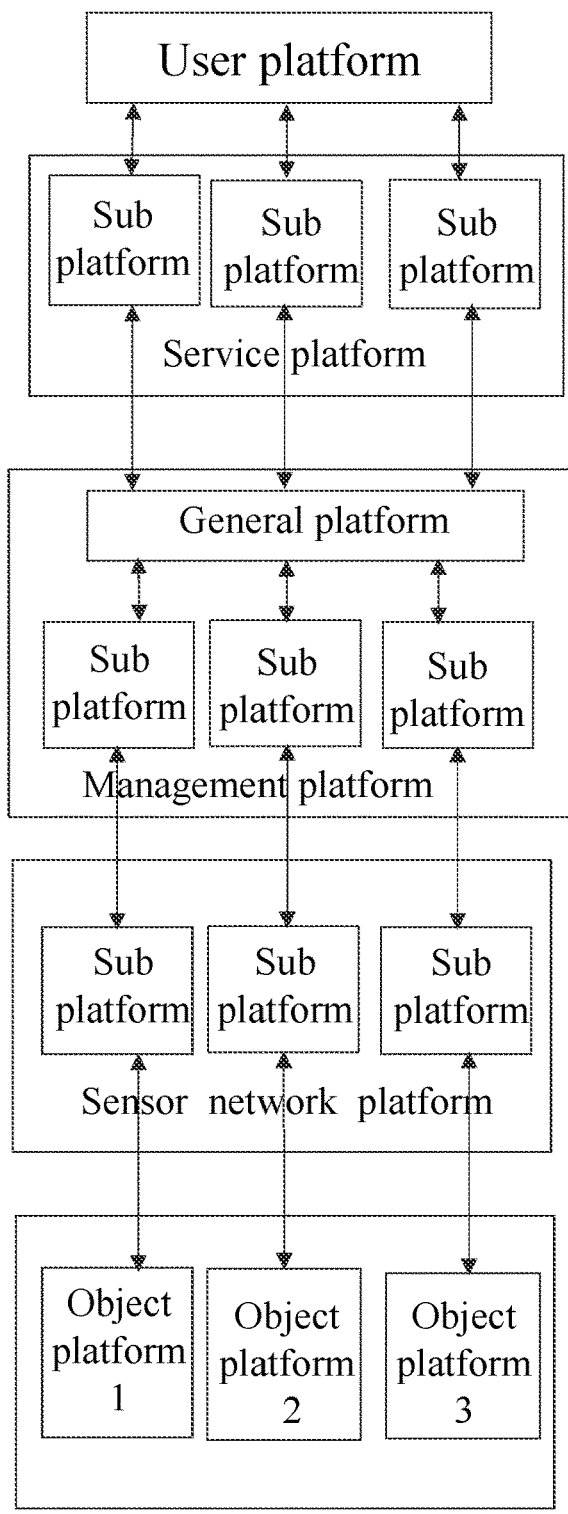
FIG. 2 shows an exemplary structural frame diagram of an Industrial Internet of Things for inspection data processing according to some embodiments of the present disclosure.
Figure 2:
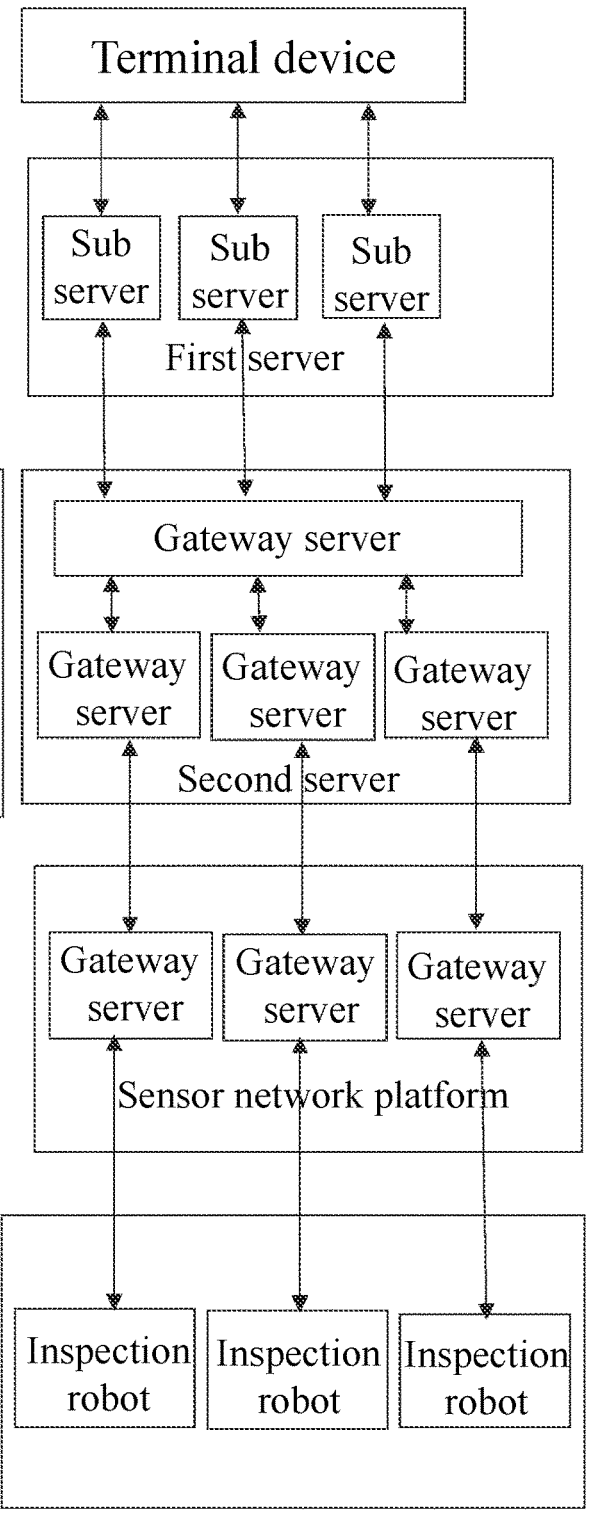

As shown in FIG. 2, the first embodiment of the present disclosure aims to provide an Industrial Internet of Things for inspection data processing. The Industrial Internet of Things for inspection data processing includes a user platform, a service platform, a management platform, a sensor network platform, and an object platform which are interacted sequentially from top to bottom.

The service platform and the sensor network platform may adopt independent layout, and the management platform may adopt front sub platform layout. The independent layout may mean that the service platform or the sensor network platform is provided with a plurality of independent sub platforms, the plurality of independent sub platforms respectively store, process, and/or transmit data of different lower platforms. The front sub platform layout may mean that the management platform is provided with a general platform and a plurality of sub platforms. The plurality of sub platforms may respectively store and process the data of different types or different receiving objects sent by the different lower platforms. The general platform may store and process data of the plurality of sub platforms after summarizing and transmit the data of the plurality of sub platforms to upper platforms. The object platform may be configured as the inspection robot in an intelligent production line.

The obtaining detection data based on the inspection robot may comprise: when the inspection robot inspects the detection site, obtaining detection data of equipment or environment corresponding to the detection site, associating identification information of the detection site with the detection data, packing the associated detection data into a detection package, and sending the detection package to the sub platform of the sensor network platform corresponding to the detection site. The identification information of the detection site may at least comprise number information of detection site and number information of current inspection robot. The sub platform of the sensor network platform receives a detection packet, converts the detection packet into a data file recognized by the management platform, and sends data file to the sub platform of the management platform corresponding to the detection site.

The determining subsequent detection or processing operations based on the detection data may comprise: receiving the data file, extracting the detection data in the data file for comparison, obtaining a comparison result, storing identification information of the detection site, the detection data, and the comparison result, and uploading them to the general platform of the management platform by the sub platform of the management platform.

After receiving corresponding data, based on the comparison result, the general platform of the management platform may execute: sending feedback instructions to corresponding sub platform of the management platform by the general platform of the management platform, sending the feedback instructions to the inspection robot through corresponding sub platform of the sensor network platform by the corresponding sub platform of the management platform, and continuing to perform detection after the inspection robot receiving the feedback instructions. After receiving corresponding data, based on the comparison result, the general platform of the management platform may execute: sending the identification information of the detection site, the detection data, and the comparison result to corresponding sub platform of the service platform by the general platform of the management platform; receiving the corresponding data and sending the corresponding data to the user platform by the corresponding sub platform of the service platform, and sending processing instructions based on the corresponding data to the corresponding sub platform of the service platform, the general platform of the management platform, corresponding sub platform of the management platform and corresponding sub platform of the sensor network platform by the user platform. The inspection robot may receive the instruction file and perform corresponding processing operations.

The Industrial Internet of Things for inspection data processing and a control method thereof are provided in the present disclosure. The Internet of Things may be built based on a five-platform structure, in which the service platform and the sensor network platform are arranged independently, so as to provide an equivalent and independent sub platform of the service platform and an equivalent and independent sub platform of the sensor network platform corresponding to different detection sites respectively, and then use the detection sites to classify the data. It is associated with the detection sites during subsequent data processing, storage and call, which facilitates data processing and monitoring, and the data classification is clear without worrying about data errors. In addition, the management platform adopts a front sub platform layout, and uses a general sub platform to connect each sub platform of the service platform and each sub platform of the management platform, as well as the classification and diversion of data, which can not only ensure the connection and data connection between the management platform and the upper and lower platforms, but also further reduce the data processing pressure of the management platform. Through various data processing of the general platform and sub platforms of the management platform, the data processing demand of each platform of the general platform and sub platforms of the management platform is greatly reduced, the construction cost is also reduced, and the data processing speed and capacity of each platform are further improved.

When using the Industrial Internet of Things for inspection data processing in the present disclosure, in combination with the Industrial Internet of Things for inspection data processing and the control method thereof, through the identification information of the current detection position of the inspection robot, all data obtained at the detection sites are independently processed and transmitted according to the sub platform of the corresponding sensor network platform and the management platform, and are processed through the general platform of the management platform, then the corresponding data processing is carried out through the sub platform of the corresponding service platform, so that the overall structure of the Internet of Things is divided into several sub IoT classified according to the detection sites. The data between each sub IoT does not affect each other, and the data source and processing path are clear, which is convenient for subsequent data processing and calling. At the same time, separate data processing through each sub IoT can also ensure that each sub IoT can quickly and effectively perform data related operations without waiting or reclassification. Each sub IoT can also set a physical structure independently based on preset needs of the corresponding detection sites, without unnecessary waste, which further reduces the building structure and cost of the Internet of Things.

It should be noted that the user platform in this embodiment may be a desktop computer, tablet computer, notebook computer, mobile phone or other electronic devices that can realize data processing and data communication, which is not limited here. In specific applications, the first server and the second server may adopt a single server or a server cluster, and there are no too many restrictions here. It should be understood that the data processing process mentioned in this embodiment may be processed by the processor of the server, and the data stored in the server may be stored on the storage device of the server, such as the hard disk and other memories. In specific applications, the sensor network platform may adopt multiple groups of gateway servers or multiple groups of intelligent routers, which are not limited here. It should be understood that the data processing process mentioned in the embodiment of the present disclosure may be processed by the processor of the gateway server, and the data stored in the gateway server may be stored on the storage device of the gateway server, such as hard disk, SSD, and other memories.

It is further explained that the Industrial Internet of Things for inspection data processing makes use of the unique design of the front sub platform of the management platform, so that the management platform has a general platform and several sub platforms. Through the general platform of the management platform, the sub platforms of the service platform and the management platform can process, classify and adjust the data of the upper and lower platforms, thus serving as a connecting link between the preceding and the following. The corresponding data is connected with other platforms corresponding to the detection site through the detection site information to ensure that each sub platform can quickly realize data processing without causing data congestion, and the data classification is also very clear. The general and sub platform structure also reduces the data processing pressure of the general platform and each sub platform of the management platform, making it easier to build the Internet of Things and reducing the cost.

In practical application, it may be necessary for the inspection robot to interrupt an established inspection route and rush to a detection position to be detected due to temporary adjustment and emergencies. Based on this, when the inspection robot performs inspection and the user platform sends detection instructions of specified detection site, the general platform of the management platform may obtain latest detection site information of the inspection robot based on stored identification information of the detection site, take next two detection sites of detection site corresponding to the detection site information as target objects, and send the detection instruction of specified detection site to a sub platform of the sensor network platform corresponding to the target objects. When the inspection robot inspects any one of the target objects, the inspection robot may receive the detection instruction of specified detection site, interrupt the detection, move to the specified detection site for detection, and return to the interrupted detection site to continue the detection after the detection is completed.

By obtaining the detection site information of the inspection robot, the current position of the inspection robot may be obtained, and next two detection sites corresponding to the current position of the inspection robot may be taken as a target object. When the inspection robot moves to any target object, it may receive instructions to perform corresponding detection. In this scheme, the next two detection sites of minimum detection site of the inspection robot may be taken as the target object, so that the inspection robot can avoid leaving the corresponding detection site when the instructions reach the next detection site of the corresponding detection site. It can take the second detection site as an instruction receive detection site, so as to avoid a problem that the inspection robot cannot receive the instructions.

Since the detection instructions of specified detection site will be sent to two target objects, if the inspection robot has received the instructions at a first target object, it is necessary to cancel the instructions of a second target object to prevent the inspection robot from re executing. The instruction cancellation steps may be as follows: when the inspection robot inspects any one of the target objects, the inspection robot receives the detection instruction of specified detection site and simultaneously sends instruction receiving information to corresponding sub platform of the sensor network platform. The sub platform of the sensor network platform sends the instruction receiving information to the general platform of the management platform through corresponding sub platform of the management platform. The general platform of the management platform obtains the instruction receiving information and sends instruction cancellation information to a sub platform of the management platform corresponding to another target object. The sub platform of the management platform receives the instruction cancellation information and sends the instruction cancellation information to the corresponding sub platform of the sensor network platform, after the corresponding sub platform of the sensor network platform receiving the instruction cancellation information, the corresponding sub platform of the sensor network platform cancels the detection instruction of specified detection site.

In the specific application, the sub platform of the management platform may receive the data file, extract the detection data in the data file for comparison, obtain a comparison result, and store identification information of the detection site, the detection data and the comparison result and upload them to the general platform of the management platform. Specifically, the sub platform of the management platform may pre store a detection data comparison table of corresponding detection site; after receiving the data file, the sub platform of the management platform may extract the detection data in the data file and compare the detection data with data in the detection data comparison table; when the detection data meets data requirements in the detection data comparison table, the comparison result may be that the data is normal; when the detection data does not meet the data requirements in the detection data comparison table, the comparison result may be that the data is abnormal; after the comparison is completed, the sub platform of the management platform may correlate the identification information of the detection site, the detection data and the comparison result, store them and upload them to the general platform of the management platform.

After the comparison is completed, as one of the specific execution steps, when the comparison result is that the data is normal, the general platform of the management platform may send the feedback instructions, and the inspection robot may continue to perform detection after receiving the feedback instructions and move to a next detection site.

After the comparison is completed, as a second of the specific execution steps, when the comparison result is that the data is abnormal, the general platform of the management platform may send the identification information of the detection site, the detection data and the comparison result to the corresponding sub platform of the service platform. The corresponding sub platform of the service platform may receive the corresponding data and send it to the user platform, the user platform may send processing instructions based on the corresponding data, the processing instructions may at least include the detection site information and inspection task adjustment data. Corresponding to the detection site information, the user platform may send the processing instructions to the corresponding sub platform of the service platform, the general platform of the management platform, the corresponding sub platform of the management platform and the corresponding sub platform of the sensor network platform. The corresponding sub platform of the sensor network platform may receive the processing instructions and convert the processing instructions into an instruction file than can be recognized by the inspection robot. The inspection robot may receive the instruction file, extract the inspection task adjustment data in the instruction file, and perform inspection based on the inspection task adjustment data.

In some embodiments, the inspection robot may receive the instruction file, extract the inspection task adjustment data in the instruction file, and perform inspection based on the inspection task adjustment data. Specifically, the inspection robot may receive the instruction file and extract the inspection task adjustment data in the instruction file and take the inspection task adjustment data as update data to update original stored inspection data of the inspection robot. After the update, the inspection robot may perform inspection according to updated inspection data. The inspection data may at least include an inspection route, coordinates of the detection sites and detection items of the detection sites.

Figure 3:
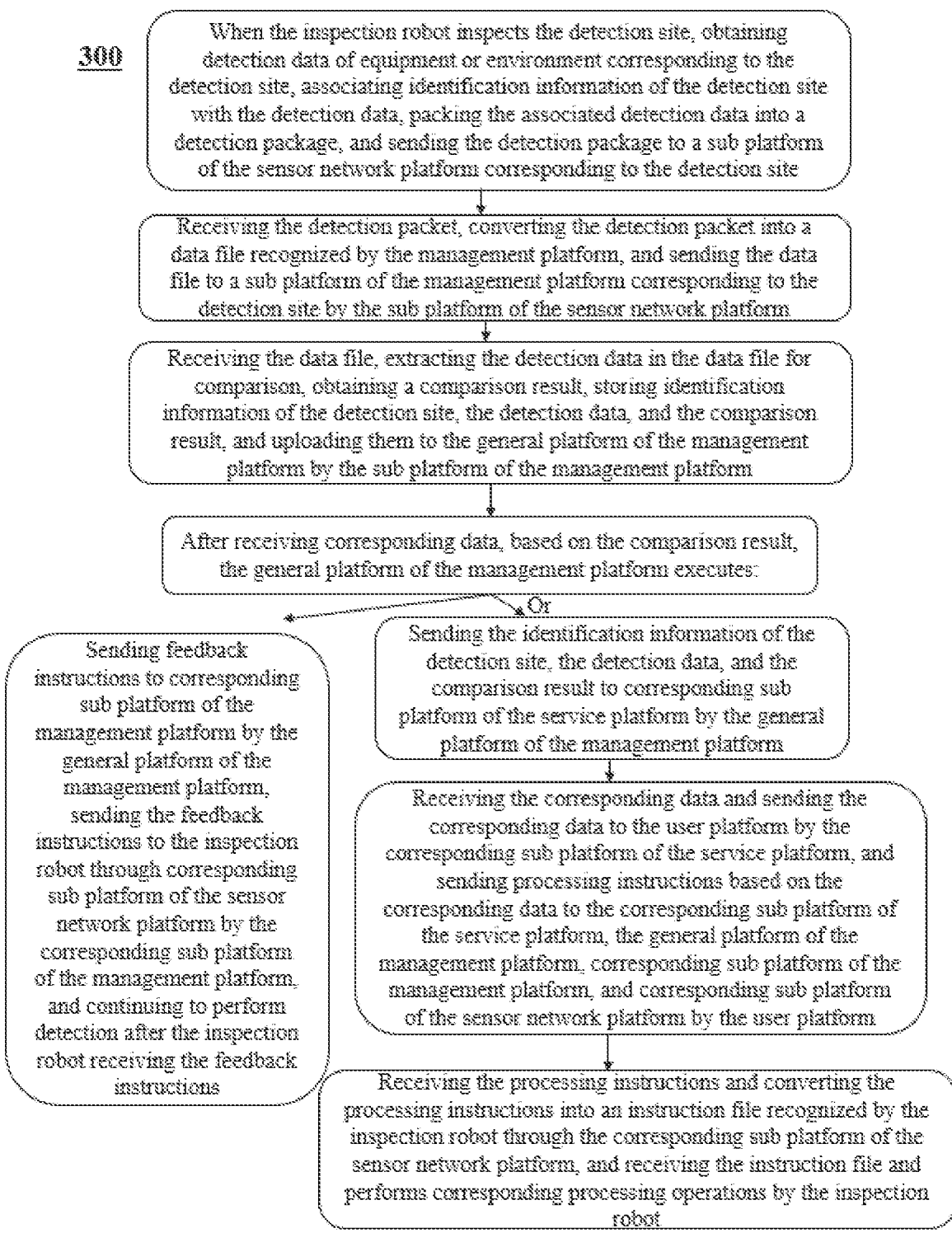
FIG. 3 shows an exemplary flowchart of a control method of an Industrial Internet of Things for inspection data processing according to some embodiments of the present specification.

As shown in FIG. 3, a second embodiment of the present disclosure provides a control method for the Industrial Internet of Things for inspection data processing. The Industrial Internet of Things for inspection data processing comprises a user platform, a service platform, a management platform, a sensor network platform, and an object platform which are interacted sequentially from top to bottom. The service platform and the sensor network platform may adopt independent layout, and the management platform may adopt front sub platform layout. The independent layout may mean that the service platform or the sensor network platform is provided with a plurality of independent sub platforms, the plurality of independent sub platforms respectively store, process, and/or transmit data of different lower platforms. The front sub platform layout may mean that the management platform is provided with a general platform and a plurality of sub platforms. The plurality of sub platforms may respectively store and process the data of different types or different receiving objects sent by the different lower platforms. A general platform may store and process data of the plurality of sub platforms after summarizing and transmit the data of the plurality of sub platforms to upper platforms. The object platform may be configured as the inspection robot in an intelligent production line. The control method may include: when the inspection robot inspects the detection site, obtaining detection data of equipment or environment corresponding to the detection site, associating identification information of the detection site with the detection data, packing the associated detection data into a detection package, and sending the detection package to the sub platform of the sensor network platform corresponding to the detection site. The identification information of the detection site may at least comprise number information of detection site and number information of current inspection robot. The sub platform of the sensor network platform may receive a detection packet, convert the detection packet into a data file recognized by the management platform, and send data file to the sub platform of the management platform corresponding to the detection site. The sub platform of the management platform may receive the data file, extract the detection data in the data file for comparison, obtain a comparison result, store identification information of the detection site, the detection data and the comparison result, and upload them to a general platform of the management platform. After receiving corresponding data, based on the comparison result, the general platform of the management platform may execute: sending feedback instructions to corresponding sub platform of the management platform by the general platform of the management platform, sending the feedback instructions to the inspection robot through corresponding sub platform of the sensor network platform by the corresponding sub platform of the management platform, and continuing to perform detection after the inspection robot receiving the feedback instructions; or the general platform of the management platform executes: sending the identification information of the detection site, the detection data, and the comparison result to corresponding sub platform of the service platform the general platform of the management platform; receiving the corresponding data and sending the corresponding data to the user platform by the corresponding sub platform of the service platform, and sending processing instructions based on the corresponding data to the corresponding sub platform of the service platform, the general platform of the management platform, corresponding sub platform of the management platform and corresponding sub platform of the sensor network platform by the user platform; and receiving the processing instructions and converting the processing instructions into an instruction file recognized by the inspection robot by the corresponding sub platform of the sensor network platform, and receiving the instruction file and performing corresponding processing operations by the inspection robot.

Those skilled in the art can realize that the units and algorithm steps of the examples described in connection with the embodiments disclosed herein can be implemented in electronic hardware, computer software, or a combination of the two. In order to clearly illustrate the interchangeability of hardware and software, the composition and steps of the examples have been generally described in the above description according to functions. Whether these functions are performed in hardware or software depends on the specific application and design constraints of the technical scheme. Professional technicians can use different methods to realize the described functions for each specific application, but such realization should not be considered beyond the scope of the present disclosure.

In the several embodiments provided in the present disclosure, it should be understood that the disclosed devices and methods can be realized in other ways. For example, the device embodiments described above are only schematic. For example, the division of the unit is only a logical function division. In actual implementation, there may be another division method, for example, multiple units or components may be combined or integrated into another system, or some features may be ignored or not executed. In addition, the mutual coupling or direct coupling or communication connection shown or discussed may be indirect coupling or communication connection through some interfaces, devices or units, or may be electrical, mechanical or other forms of connection.

The units described as separate parts may or may not be physically separated. As a person of ordinary skill in the art, it can be realized that the units and algorithm steps of the examples described in combination with the embodiments disclosed herein can be implemented in electronic hardware, computer software, or a combination of the two. In order to clearly illustrate the interchangeability of hardware and software, the composition and steps of the examples have been generally described in the above description according to functions. Whether these functions are performed in hardware or software depends on the specific application and design constraints of the technical scheme. Professional technicians can use different methods to realize the described functions for each specific application, but such realization should not be considered beyond the scope of the present disclosure.

In addition, each functional unit in each embodiment of the present disclosure may be integrated into a processing unit, or each unit may exist separately, or two or more units may be integrated into one unit. The above integrated units may be realized in the form of hardware or software functional units.

The integrated unit may be stored in a computer readable storage medium if it is realized in the form of a software functional unit and sold or used as an independent product. Based on this understanding, the technical solution of the present disclosure, in essence, or the part that contributes to the prior art, or all or part of the technical solution, can be embodied in the form of a software product, which is stored in a storage medium, including a number of instructions to enable a computer device (which may be a personal computer, a server, or a grid device, etc.) to perform all or part of the steps of the methods described in the various embodiments of the specification. The aforementioned storage media may include: USB flash disk, mobile hard disk, read only memory (ROM), random access memory (RAM), magnetic disc or optical disc and other media that can store program codes.

The specific embodiments described above have further described in detail the purpose, technical scheme and beneficial effects of the present disclosure. It should be understood that the above is only a specific embodiment of the present disclosure and is not used to limit the scope of protection of the present disclosure. Any modification, equivalent replacement, improvement, etc. made within the spirit and principles of this manual shall be included in the protection scope of this manual.

Figure 4:
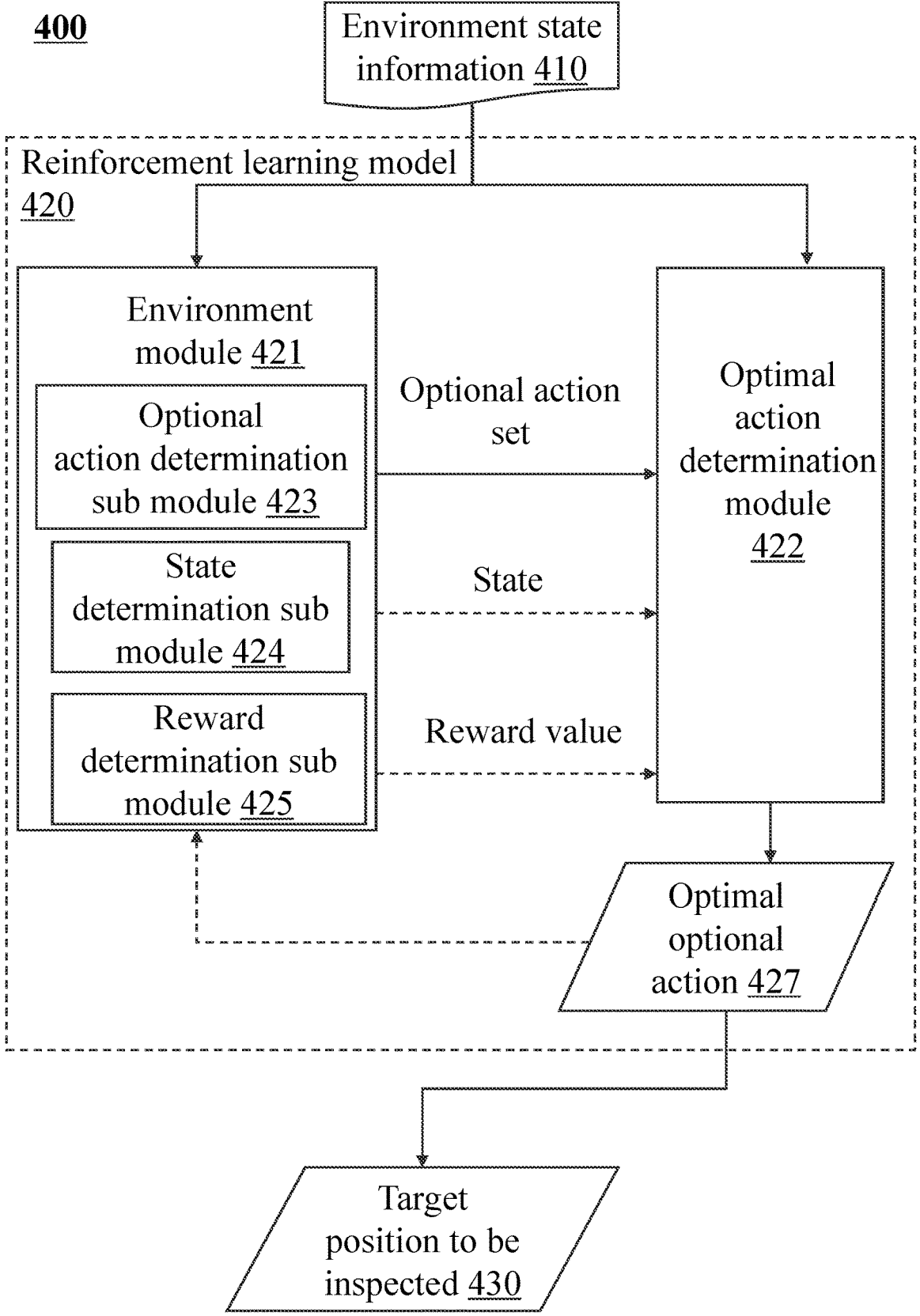
FIG. 4 shows an exemplary schematic diagram of determining a target position to be inspected based on a reinforcement learning model according to some embodiments of the present disclosure.

FIG. 4 shows an exemplary schematic diagram of determining a target position to be inspected based on a reinforcement learning model according to some embodiments of the present disclosure. In some embodiments, the process 400 may be performed by the management platform.

As shown in FIG. 4, the management platform may input environment state information 410 into reinforcement learning model 420, and reinforcement learning model 420 may output target position to be inspected 430 according to the input environment state information 410. For more information about the target position to be inspected, please refer to FIG. 1 and its related descriptions.

The environment state information may refer to information used to describe states involved in process of the inspection robot performing the inspection task. In some embodiments, the environment state information 410 may include state information of the inspection robot and state information of the inspection task.

The state information of the inspection robot may refer to information used to describe a current state of the inspection robot. For example, the state information of the inspection robot may include the current position of the inspection robot.

In some embodiments, the management platform may obtain the current position of the inspection robot through one or more position sensors deployed on the inspection robot or other means, so as to determine the state information of the inspection robot.

State information of the inspection task may refer to information used to describe a current state of the inspection task. For example, the state information of the inspection task may include inspection condition of the inspection task. The inspection condition of the inspection task may include information on whether each detection site in the inspection task is a position to be inspected and whether detection data of the detected position in the inspection task is normal.

The inspection condition of the inspection task may be expressed in various ways. In some embodiments, the inspection condition of the inspection task may be represented by an inspection condition vector. Dimension of the inspection condition vector may be a total number of detection sites set in the field environment. Each detection site in the inspection task may correspond to an element in the inspection condition vector, and different element values may represent different meanings. For example, the element value may be defined as follows: an element value of 0 may mean that the corresponding detection site is the position to be detected; an element value of 1 may mean that the corresponding detection site is the detected position and the detection data is normal; an element value of −1 may mean that the corresponding detection site is the detected position and the detection data is abnormal; and an element value of −2 may mean that the inspection task does not contain the detection site corresponding to the element. For example, it is assumed that the total number of detection sites set in the field environment may be 10, including the No. 1 detection site, the No. 2 detection site, . . . , and a No. 10 detection site. The detection task may be to detect the No. 3 detection site, a No. 5 detection site, and a No. 6 detection site and obtain detection data. The No. 3 detection site may be the detected position and the detection data may be normal, and the No. 5 detection site and the No. 6 detection site may be the positions to be inspected. The inspection condition vector of the inspection task may be expressed as (−2, −2, 1, −2, 0, 0, −2, −2, −2, −2, −2).

In some embodiments, the inspection condition of the inspection task may be stored in the management platform, and the management platform may obtain the inspection condition of the inspection task to determine the state information of the inspection task.

The reinforcement learning model 420 may be used to determine the target position to be inspected. The input of the reinforcement learning model 420 may be environment state information 410, and the output of the reinforcement learning model 420 is the target position to be inspected 430. The reinforcement learning model 420 may include an environment module 421 and an optimal action determination module 422.

In some embodiments, when the target position to be inspected 430 is determined based on the reinforcement learning model 420, the environment state information 410 may be input into the reinforcement learning model 420. In the model, the environment state information 410 may be input into the environment module 421, and the environment module 421 may output a set of optional actions. In the model, the environment state information 410 and the set of optional actions may be input into the optimal action determination module 422, and the optimal action determination module 422 may output an optimal optional action. The position to be inspected corresponding to the optimal optional action 427 output by the optimal action determination module 422 may be determined as the target position to be inspected 430, which is used as output of the reinforcement learning model 420. For example, if the optimal optional action is to go to the No. 1 detection position, the target position to be inspected may be the No. 1 detection site.

The environment module 421 may include an optional action determination sub module 423, a state determination sub module 424, and a reward determination sub module 425. In a prediction process of the reinforcement learning model 420, the environment module 421 may determine the set of optional actions through the optional action determination sub module 423 based on the environment state information 410. In a training process of reinforcement learning model 420, the state determination sub module 424 and the reward determination sub module 425 in the environment module 421 may be used to determine the environment state information and the reward value at a next time, respectively.

The optional action determination sub module 423 may determine the set of optional actions of the inspection robot at the current time based on environmental state information of the current time.

The set of optional actions may refer to the set of actions that may be performed by the inspection robot in an environmental state. The actions that may be performed by the inspection robot may be to go to a position to be inspected in the inspection task for inspection. Under different environmental conditions, a set of optional actions of the inspection robot may be different.

In some embodiments, the optional action determination sub module 423 may detect the detection site corresponding to an element value of 0 in the state information of the inspection task based on the state information of the inspection task in the environment status information at a current time, and determine it as the set of optional actions of the inspection robot at the current time. For example, the inspection task may be to detect the No. 1 detection site, the No. 2 detection site, and the No. 3 detection site and obtain the detection data. If the state information of the inspection task at the current time is (0, 0, 1), then "go to the No. 1 detection site and go to the No. 2 detection site" may be determined as set of optional actions of the inspection robot at the current time.

The state determination sub module 424 may determine the environment state information at the next time based on the environment state information at the current time and the optimal optional action output by the optimal action determination module. For example, the detection task may be to detect the No. 1 detection site, the No. 2 detection site, and the No. 3 detection site and obtain the detection data. The state information of the inspection task at the current time may be (0, 0, 1). The optimal optional action output by the optimal action determination module may be to go to the No. 1 detection site for detection. After the inspection robot completes the detection and the detection data is normal, the state determination sub module 424 may determine the state information of the inspection task at the next time as (1, 0, 1).

The reward determination sub module 425 may be used to determine the reward value. The reward value may be used to evaluate an improvement degree of inspection efficiency by actions performed by the inspection robot. For example, for actions with a high degree of improvement, the higher the reward value may be; For actions with a low degree of improvement or negative improvement, the reward value may be lower. The reward value may be expressed in numerical value or other ways. The improvement degree of inspection efficiency may be determined based on the distance between the current position of the inspection robot and the target position to be inspected. The closer the distance is, the smaller a detour risk of the inspection robot is, the greater the improvement degree of inspection efficiency is. In some embodiments, the reward determination sub module 425 may determine the reward value based on a set formula.

In some embodiments, the reward value of the inspection robot performing an action may be related to the distance between the current position of the inspection robot and the target position to be inspected corresponding to the action. For example, reward values corresponding to various distance values may be recorded in preset comparison tables, and then the reward values may be determined by looking up the preset comparison table based on the distance values. The smaller the distance between the target position to be inspected corresponding to the action and the current position of the inspection robot is, the greater the reward value of the inspection robot performing the action is.

In some embodiments, the reward value of the inspection robot performing an action may also be related to an abnormal probability of the position to be inspected corresponding to the action. For example, the greater the abnormal probability of the position to be inspected corresponding to the action is, the greater the reward value of the inspection robot performing the action is.

The abnormal probability may refer to a probability that the detection data of the position to be inspected is abnormal. Each abnormal probability of each position to be inspected may be expressed in various ways, such as percentage.

In some embodiments, the abnormal probability of the position to be inspected may be determined based on historical detection conditions of the position to be inspected. The historical detection conditions of the position to be inspected may include a number of times that the position to be inspected has been historically performed and a number of times that historical detection data of the position to be inspected is abnormal. In some embodiments, the abnormal probability of the position to be inspected may be a ratio of the number of times that the historical detection data of the position to be inspected is abnormal to the number of times that the position to be inspected has been historically performed.

In some embodiments, the management platform may also determine a frequent item related to the inspection condition vector of an inspection task based on a frequent item algorithm and determine the abnormal probability of the position to be inspected based on the frequent item. For more information about determining the abnormal probability of the position to be inspected based on the frequent item, please refer to FIG. 5 and its related descriptions.

In some embodiments, the management platform may also process the inspection condition vector of an inspection task based on an abnormal probability determination model to determine an abnormal probability vector; determine the abnormal probability of the position to be inspected based on the abnormal probability vector. The abnormal probability determination model may be a machine learning model. For more information about determining the abnormal probability of the position to be inspected based on the abnormal probability determination model, please refer to FIG. 6 and its related descriptions.

In some embodiments, the management platform may determine the reward value of the inspection robot performing an action based on a distance between the current position of the inspection robot and the position to be inspected corresponding to the action, and the abnormal probability of the position to be inspected corresponding to the action. For example, the reward value of the inspection robot performing an action may be calculated by the following formula (1):

$$r = \frac{k_1 \overline{d}}{d} + k_2 \frac{\overline{p}}{p}, \tag{1}$$

where r is the reward value of the action, d is the distance between the current position of the inspection robot and the position to be inspected corresponding to the action, $\overline{d}$ is an average distance between the current position of the inspection robot and the position to be inspected corresponding to the set of optional actions, p is the abnormal probability of the position to be inspected corresponding to the action, $\overline{p}$ is an average value of abnormal probabilities of the position to be inspected corresponding to the set of optional actions, $k_1$ and $k_2$ are preset parameters for adjusting a base size of the reward value. The greater the $k_1$ is, the greater the reward value brought by choosing a better distance is. The inspection robot may be more inclined to choose a closer position to be inspected as the target position to be inspected. The greater the $k_2$ is, the greater the reward value brought by choosing a better abnormal probability is. The inspection robot may be more inclined to choose a location to be inspected with a higher abnormal probability as the target position to be inspected. $k_1$ and $k_2$ may be determined based on experience. For example, $k_1$ and $k_2$ may both be 1.

In some embodiments of the present disclosure, the target position to be inspected may be determined by introducing the abnormal probability of the position to be inspected based on the distance between the current position of the inspection robot, and the position to be inspected, as well as the abnormal probability of the position to be inspected. This method makes the inspection robot not only consider the distance, but also consider the position to be inspected with high abnormal probability under a decision-making of the reinforcement learning model (such inspection robots need to go to the inspection position first to eliminate the fault as soon as possible). Therefore, factors considered by the inspection robot when carrying out inspection are more comprehensive.

The optimal action determination module 422 may determine the optimal optional action based on the environmental state information 410 and the set of optional actions at the current time. An input of the optimal action determination module 422 may be the environment state information 410 and the set of optional actions. An output of the optimal action determination module 422 may be the optimal optional action 427.

In some embodiments, for each optional action in the set of optional actions, the optimal action determination module 422 may internally output a recommended value, and the optimal action determination module may determine the optional action with a largest recommended value as the optimal optional action and output it.

In some embodiments, the optimal action determination module 422 may be a machine learning model and may be implemented by various methods, such as deep neural network (DNN), convolutional neural network (CNN), cyclic neural network (RNN), etc.

In some embodiments, the optimal action determination module may be trained based on reinforcement learning methods, such as deep Q-learning network (DQN), double deep Q-learning network (DDQN), etc. Training samples may be historical environment state information, and a label may be a corresponding optimal optional action under the historical environment state information. The training samples may be obtained based on historical data. Labels of the training samples may be obtained by reinforcement learning.

In some embodiments, the management platform may periodically perform the reinforcement learning model 420 and output the optimal optional actions based on a preset trigger condition. For example, the preset trigger condition may be that the inspection robot completes the optimal optional action currently output by the reinforcement learning model 420.

In some embodiments of the present disclosure, by defining the reward value related to a distance between the current position and the position to be inspected, the reinforcement learning model may be trained based on the reward value under the definition, so that a trained reinforcement learning model may select the target position to be inspected at a current time from a global optimization, rather than only selecting the target position to be inspected based on a current optimization. Therefore, an inspection efficiency of the inspection robot may be effectively improved.

Figure 5:
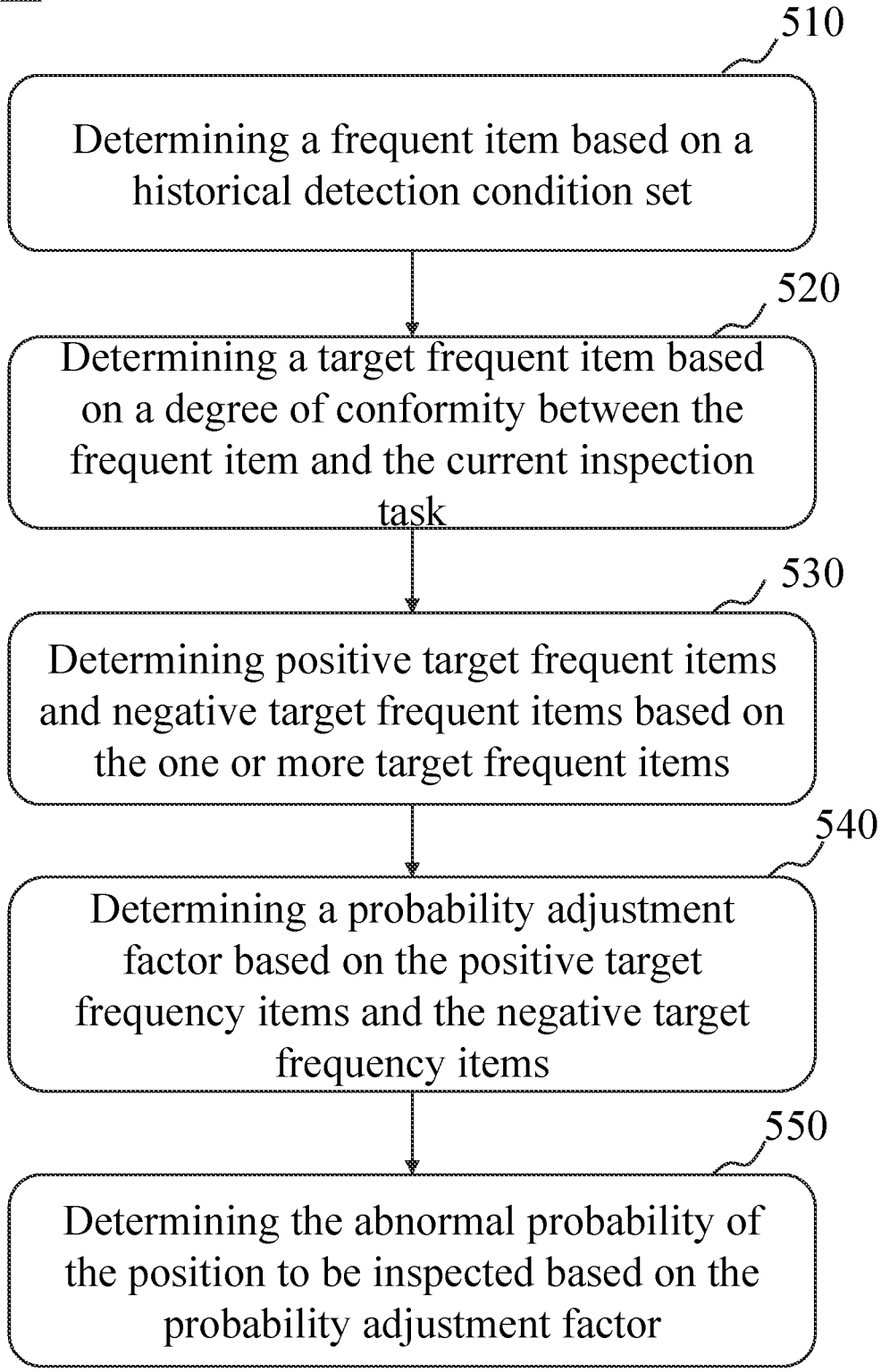
FIG. 5 shows an exemplary flowchart for determining an abnormal probability of the target position to be inspected based on a frequent item according to some embodiments of the present disclosure.

FIG. 5 shows an exemplary flowchart for determining an abnormal probability of the target position to be inspected based on a frequent item according to some embodiments of the present disclosure. In some embodiments, the process 500 may be executed by the management platform. As shown in FIG. 5, the process 500 may include the following steps.

In step 510, determining a frequent item based on a historical detection condition set.

The historical detection condition set may refer to a set composed of the detection conditions of historical detection tasks. For example, the historical detection condition set may be a set of inspection condition vectors of at least one historical detection task. In some embodiments, the management platform may determine the historical detection conditions set by obtaining detection conditions of at least one stored historical detection task.

The frequent item may refer to an item set whose support meets preset conditions. The item set may refer to a set composed of at least one data item. For example, k item set may refer to a set composed of k data items. The data items may refer to detection conditions of the detection sites. For example, 3 item set may be: detection data of the No. 1 detection site is normal, detection data of the No. 3 detection site is normal, and detection data of a No. 7 detection site is abnormal.

Support may refer to a frequency of appearance of an item set in the historical detection condition set. For example, if the support of an item set is 3, it may mean that the item set has appeared 3 times in the historical detection condition set.

In some embodiments, a threshold may be set and an item set with a support greater than the threshold and a maximum k value may be determined as the frequent item. For example, if there are 1 item set, 2 item set, and 3 item set that meet support conditions, and there are no 4 item set that meet the support conditions, the 3 item set that meet the support conditions may be determined as the frequent item. In some embodiments, the frequent item may be determined using algorithms such as FP growth, Apriori, etc.

In step 520, determining a target frequent item based on a degree of conformity between the frequent item and the current inspection task.

The degree of conformity may refer to a degree to which the detection sites and their detection conditions in the frequent item are consistent with the detected positions and their detection conditions in the current inspection task. For example, the degree of conformity may be determined by the following formula (2):

$$a = b_1 b_2 \qquad (2),$$

where a is the degree of conformity, $b_1$ is a proportion of detection sites in the frequent item contained in the detected positions in the current inspection task, $b_2$ is a conformity ratio between detection condition of the detection sites in the frequent item contained in the detected positions in the current inspection task and detection condition of the detection sites in the frequent item. For example, a frequent item may be that: detection data of the No. 1 detection site is normal, detection data of the No. 3 detection site is normal, detection data of the No. 5 detection site is abnormal, and detection data of the No. 6 detection site is abnormal. The detected positions in the inspection task and their detection conditions may be that: detection data of the No. 3 detection site is normal, detection data of the No. 5 detection site is normal, detection data of a No. 8 detection site is normal. Then, the detected positions in the inspection task are the No. 3 detection site, the No. 5 detection site and the No. 8 detection site, which include the No. 3 detection site and the No. 5 detection site in the frequent item, so there is $b_1=2/3$. In the above two detection sites of the No. 3 detection site and the No. 5 detection site, only the detection data of the No. 3 detection site is the same (both are normal), so there is $b_2=1/2$.

In some embodiments, the management platform may determine one or more frequent items whose degree of conformity is greater than the threshold and including the position to be inspected where the abnormal probability is currently to be determined as one or more target frequent items. For example, if a threshold of the degree of conformity is set to 80%, in the current inspection task, the detected positions and their detection conditions may be that: the No. 1 detection position is normal, the No. 2 detection position is normal, and the No. 3 detection position is normal. The positions to be inspected may include the No. 4 detection position and the No. 5 detection position. Currently, the position to be inspected to determine the abnormal probability may be set to No. 4 detection position. Frequent item A may be that: if the No. 1 detection site is normal, the No. 2 detection site is normal, the No. 3 detection site is normal, and the No. 4 detection site is normal, then the degree of conformity of the frequent item A may be: 3/3=100%, which is greater than 80% of the threshold of the degree of conformity, and the frequent item may include the No. 4 detection site (i.e. the position to be inspected where the abnormal probability is currently to be determined). Therefore, the frequent item A may be the target frequent item corresponding to the position to be inspected where the abnormal probability is currently to be determined.

In step 530, determining positive target frequent items and negative target frequent items based on the one or more target frequent items.

The positive target frequent items may refer to target frequent items in which detection data of detection sites is abnormal corresponding to the position to be inspected where the abnormal probability is currently to be determined in the inspection task.

The negative target frequent items may refer to target frequent items in which detection data of detection sites is normal corresponding to the position to be inspected where the abnormal probability is currently to be determined in the inspection task.

For example, the frequent item A is set as that: detection data of the No. 1 detection site is normal, detection data of the No. 3 detection site is normal, detection data of the No. 5 detection site is abnormal, and detection data of the No. 6 detection site is abnormal; a frequent item B is set as that: detection data of the No. 1 detection site is normal, detection data of the No. 3 detection site is normal, detection data of the No. 5 detection site is abnormal, and detection data of the No. 6 detection site is normal. If the position to be inspected where the abnormal probability is currently to be determined in the inspection task is the No. 6 detection site, then the frequent item A may be a positive target frequent item, and the frequent item B may be a negative target frequent item.

In step 540, determining a probability adjustment factor based on the positive target frequency items and the negative target frequency items.

The probability adjustment factor may be used to adjust the abnormal probability of the position to be inspected. The probability adjustment factor may be expressed in various ways. For example, the probability adjustment factor may be a real number greater than 0.

In some embodiments, the management platform may determine the probability adjustment factor based on a ratio of a number of positive target frequent items to a number of negative target frequent items. For example, the probability adjustment factor may be calculated by the following formula (3):

$$c=n_1/n_2 \qquad (3),$$

Where c is the probability adjustment factor, $n_1$ is a number of the positive target frequency items, $n_2$ is a number of the negative target frequency items.

In step 550, determining the abnormal probability of the position to be inspected based on the probability adjustment factor.

In some embodiments, the management platform may determine a product of an initial abnormal probability of the position to be inspected and the probability adjustment factor as the abnormal probability of the position to be inspected. The initial abnormal probability of the position to be inspected may be determined based on the historical detection conditions of the position to be inspected. For example, the initial abnormal probability of the position to be inspected may be the ratio of the number of times that the historical detection data of the position to be inspected may be abnormal to the number of times that the position to be inspected has been historically performed.

For example, the abnormal probability of the position to be inspected may be calculated by the following formula (4):

$$p_n=cp_o \qquad (4),$$

where $p_n$ is the abnormal probability of the position to be inspected, c is the probability adjustment factor, $p_o$ is the initial abnormal probability of the position to be inspected.

In some embodiments, the management platform may update the abnormal probability of the position to be inspected based on newly obtained detection data. For example, operations of determining the abnormal probability of the position to be inspected based on the frequent item may be performed periodically based on preset trigger conditions. The preset trigger conditions may be that the inspection robot goes to a position to be inspected in the inspection task for inspection.

In some embodiments of the present disclosure, by determining the frequent item, the abnormal probability of the position to be inspected may be adjusted based on the detection data of the detected position, reflecting an internal correlation between the detection sites, and the abnormal probability of the position to be inspected may be more accurately determined.

Figure 6:
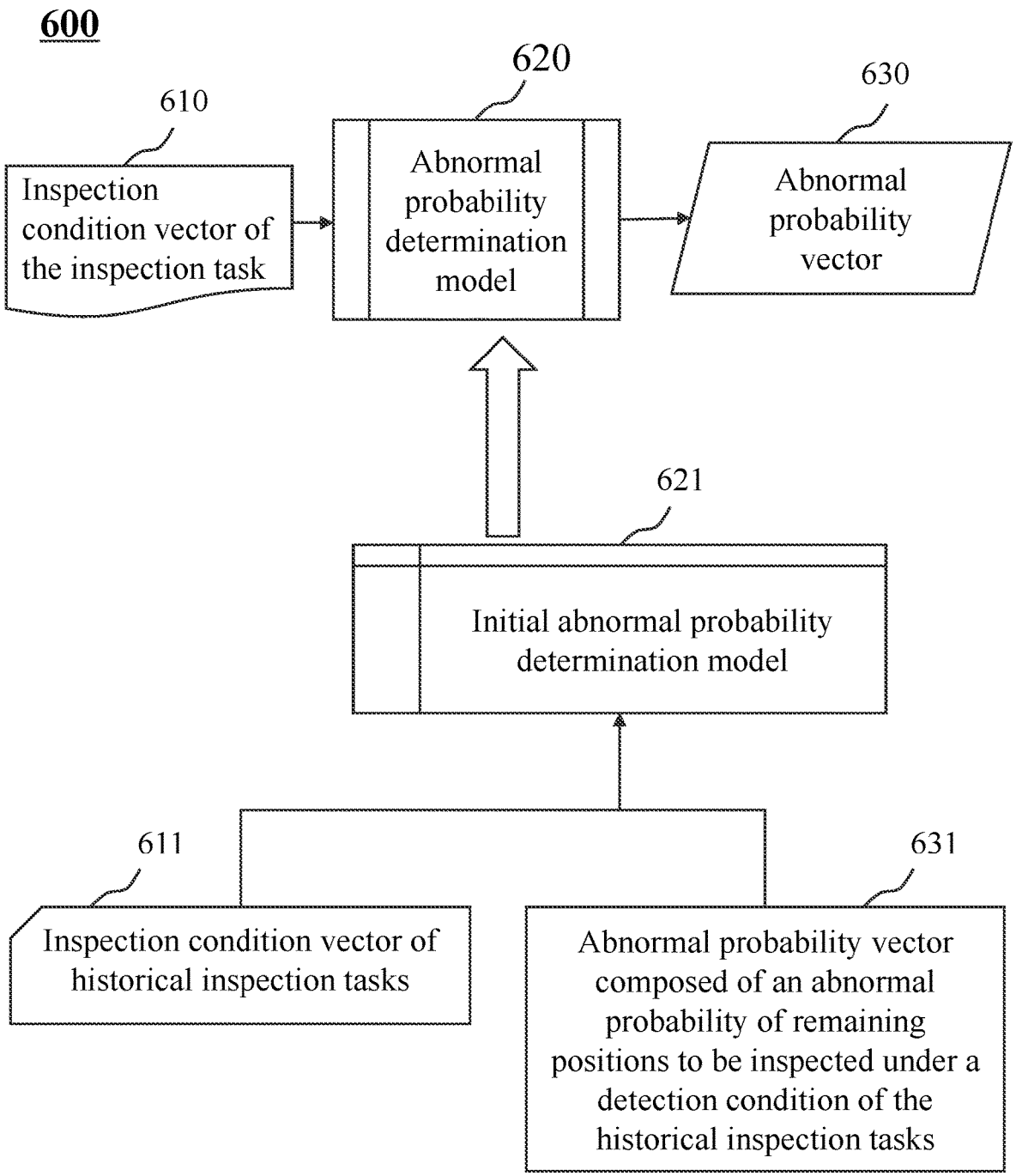
FIG. 6 shows an exemplary schematic diagram of determining the abnormal probability of the target position to be inspected based on the abnormal probability determination model according to some embodiments of the present disclosure.

FIG. 6 shows an exemplary schematic diagram of determining the abnormal probability of the target position to be inspected based on the abnormal probability determination model according to some embodiments of the present disclosure. In some embodiment, the process 600 may be performed by the management platform.

In some embodiments, the management platform may process the inspection condition vector 610 of the inspection task to determine the abnormal probability vector 630 based on the abnormal probability determination model 620, and determine the abnormal probability of the position to be inspected based on the abnormal probability vector 630. The abnormal probability determination model 620 may be a machine learning model.

The abnormal probability vector may refer to a vector composed of the abnormal probability of the position to be inspected in the inspection task. Dimensions of the abnormal probability vector may be a total number of detection sites set in the field environment. Each element in the abnormal probability vector may correspond to a detection site, and different element values may represent different meanings.

For example, the element values may be defined as follows: an element value of −1 may mean that a corresponding detection site is the detected position and corresponding detection data is normal; an element value of −2 may mean that a corresponding detection site is the detected position and corresponding detection data is abnormal; a positive element value may mean that a corresponding detection site is the position to be inspected and the positive element value may be the abnormal probability of the position to be inspected output by the abnormal probability determination model; and an element value of −3 may mean that the inspection task does not contain a detection site corresponding to the element. For example, the total number of detection sites set in the field environment is 10, which are the No. 1 detection site, the No. 2 detection site, . . . , and the No. 10 detection site in turn. The inspection task may be to detect the No. 3 detection site, the No. 5 detection site, and the No. 6 detection site and obtain corresponding detection data. The No. 3 detection position may be the detected position and corresponding detection data may be normal, and the No. 5 detection position and the No. 6 detection position may be the positions to be inspected. Then an abnormal probability vector output by the abnormal probability determination model may be expressed as (−3, −3, −1, −3, 35, 25, −3, −3, −3, −3, and −3). From this vector, it can be known abnormal probabilities of the positions to be inspected may be that: an abnormal probability of the No. 5 detection site may be 35% and an abnormal probability of the No. 6 detection site may be 25%.

In some embodiments, the management platform may input the inspection condition vector 610 of the inspection task into the abnormal probability determination model 620, and determine the abnormal probability vector 630 through the abnormal probability determination model 620.

In some embodiments, the management platform may obtain elements whose element value is a positive number in the abnormal probability vector 630, and successively determine each element value as the abnormal probability of the position to be inspected corresponding to each element.

In some embodiments, determining the abnormal probability of the position to be inspected based on the abnormal probability determination model may be carried out periodically based on the preset trigger condition. For example, the preset trigger condition may be that the inspection robot goes to a position to be inspected in the inspection task for inspection.

In some embodiments, the abnormal probability determination model 620 may be obtained by training. For example, the training samples may be input into an initial abnormal probability determination model 621, a loss function may be constructed based on outputs of the initial abnormal probability determination model 621, and parameters of the initial abnormal probability determination model 621 may be iteratively updated based on the loss function until the preset trigger condition is met and the training is completed.

In some embodiments, the training samples may include the inspection condition vector 611 of historical inspection tasks. The training samples may be obtained based on historical data, and the label may be the abnormal probability vector 631 composed of an abnormal probability of remaining positions to be inspected under a detection condition of the historical inspection tasks. The label may be marked based on the abnormal probability of remaining positions to be inspected under a historical detection condition of the manual statistical historical detection inspections.

In some embodiments of the present disclosure, the abnormal probability determination model 1250 may be trained based on a large amount of historical data, so that the model can effectively learn an internal relationship between the inspection condition vector of the inspection task and the abnormal probability of the position to be inspected, so that the abnormal probability of the position to be inspected can be accurately predicted.

The basic concepts have been described above. Obviously, for those skilled in the art, the above detailed disclosure is only an example and does not constitute a limitation of the present disclosure. Although it is not explicitly stated here, those skilled in the art may make various modifications, improvements and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about", "approximate" or "generally" in some examples. Unless otherwise stated, "approximately" or "generally" indicate that a ±20% change in the figure is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. An Industrial Internet of Things system for inspection data processing, comprising a user platform, a service platform, a management platform, a sensor network platform, and an object platform interacting sequentially from top to bottom, wherein the service platform and the sensor network platform adopt an independent layout, and the management platform adopts a front sub platform layout; the independent layout means that the service platform or the sensor network platform is provided with a plurality of independent sub platforms, the plurality of independent sub platforms respectively store, process, and/or transmit data of different lower platforms; the front sub platform layout means that the management platform is provided with a general platform and a plurality of sub platforms, the plurality of sub platforms respectively store and process data of different types or different receiving objects sent by different lower platforms, and the general platform stores and processes data of the plurality of sub platforms after summarizing, and transmits the data of the plurality of sub platforms to upper platforms;

the object platform is configured as an inspection robot in an intelligent production line; when the inspection robot inspects a detection site, the inspection robot is used to obtain detection data of equipment or environment corresponding to the detection site, associate identification information of the detection site with the detection data, pack the associated detection data into a detection package, and send the detection package to a sub platform of the sensor network platform corresponding to the detection site;

the corresponding sub platform of the sensor network platform is configured to receive the detection package, convert the detection package into a data file recognized by the management platform, and send the data file to a sub platform of the management platform corresponding to the detection site; the corresponding sub platform of the sensor network platform is further configured to receive processing instructions sent by the user platform through a corresponding sub platform of the service platform, the general platform of the management platform, and the corresponding sub platform of the management platform, and convert the processing instructions into an instruction file recognized by the inspection robot, and the inspection robot receives the instruction file and performs corresponding move and detection operations;

the corresponding sub platform of the management platform is configured to receive the data file, extract the detection data in the data file for comparison, obtain a comparison result, store identification information of the detection site, the detection data, and the comparison result, and upload the identification information of the detection site, the detection data, and the comparison result as a corresponding data of the sub platform of the management platform to the general platform of the management platform;

after receiving the corresponding data of the sub platform of the management platform, based on the comparison result, the general platform of the management platform is configured to send feedback instructions to the corresponding sub platform of the management platform, the corresponding sub platform of the management platform sending the feedback instructions to the inspection robot through the corresponding sub platform of the sensor network platform, and the inspection robot continuing to perform detection after receiving the feedback instructions before moving to a next detection site; or the general platform of the management platform is configured to send the identification information of the detection site, the detection data, and the comparison result to the corresponding sub platform of the service platform, the corresponding sub platform of the service platform receiving the identification information of the detection site, the detection data, and the comparison result and sending the identification information of the detection site, the detection data, and the comparison result to the user platform, and the user platform sending, based on the identification information of the detection site, the detection data, and the comparison result, the processing instructions to the corresponding sub platform of the service platform, the general platform of the management platform, the corresponding sub platform of the management platform, and the corresponding sub platform of the sensor network platform;

wherein the general platform of the management platform is further configured to:

when the inspection robot performs inspection and the user platform sends detection instructions of a specified detection site, obtain latest detection site information of the inspection robot based on the stored identification information of the detection site, take next two detection sites of a detection site corresponding to the detection site information as target objects, and send the detection instruction of the specified detection site to sub platforms of the sensor network platform corresponding to the target objects; and when the inspection robot inspects any one of the target objects, receive the detection instruction of specified detection site, interrupt the detection, move to the specified detection site for detection, and return to the interrupted detection site to continue the detection after the detection for the specified detection site is completed.

2. The Industrial Internet of Things system for inspection data processing of claim 1, wherein when the inspection robot inspects any one of the target objects, the inspection robot is further configured to receive the detection instruction of the specified detection site and simultaneously send instruction receiving information to the corresponding sub platform of the sensor network platform; and the sub platform of the sensor network platform sends the instruction receiving information to the general platform of the management platform through the corresponding sub platform of the management platform;

the general platform of the management platform is further configured to obtain the instruction receiving information and send instruction cancellation information to a sub platform of the management platform corresponding to another target object; and the sub platform of the management platform corresponding to the another target object is further configured to receive the instruction cancellation information and send the instruction cancellation information to the sub platform of the sensor network platform corresponding to the another target object, after the sub platform of the sensor network platform corresponding to the another target object receiving the instruction cancellation information, the sub platform of the sensor network platform corresponding to the another target object cancels the detection instruction of the specified detection site.

3. The Industrial Internet of Things system for inspection data processing of claim 1, wherein the corresponding sub platform of the management platform is further configured to:

pre-store a detection data comparison table corresponding to a detection site in the corresponding sub platform of the management platform;

extract the detection data in the data file and compare the detection data with data in the detection data comparison table after receiving the data file;

the comparison result being that the data is normal when the detection data meets data requirements in the detection data comparison table; and the comparison result being that the data is abnormal when the detection data does not meet the data requirements in the detection data comparison table; and correlate the identification information of the detection site, the detection data, and the comparison result, store the identification information of the detection site, the detection data, and the comparison result and upload the identification information of the detection site, the detection data, and the comparison result to the general platform of the management platform after the comparison is completed.

4. The Industrial Internet of Things system for inspection data processing of claim 3, wherein in response to the comparison result is that the data is normal, the general platform of the management platform sends the feedback instructions, and the inspection robot continues to perform detection after receiving the feedback instructions and moves to a next detection site.

5. The Industrial Internet of Things system for inspection data processing of claim 3, wherein in response to the comparison result is that the data is abnormal, the general platform of the management platform is further configured to send the identification information of the detection site, the detection data, and the comparison result as a corresponding data of the sub platform of the service platform to the corresponding sub platform of the service platform;

the corresponding sub platform of the service platform receives the corresponding data of the sub platform of the service platform and sends the corresponding data of the sub platform of the service platform to the user platform, the user platform is further configured to send the processing instructions based on the corresponding data of the sub platform of the service platform, the processing instructions at least including the detection site information and inspection task adjustment data;

the user platform sends the processing instructions to the corresponding sub platform of the service platform, the general platform of the management platform, the corresponding sub platform of the management platform, and the corresponding sub platform of the sensor network platform;

the corresponding sub platform of the sensor network platform receives the processing instructions and converts the processing instructions into the instruction file recognized by the inspection robot; and the inspection robot is further configured to receive the instruction file, extract the inspection task adjustment data in the instruction file, and perform inspection based on the inspection task adjustment data.

6. The Industrial Internet of Things system for inspection data processing of claim 5, wherein the inspection robot is further configured to:

receive the instruction file, and extract the inspection task adjustment data in the instruction file; and take the inspection task adjustment data as update data to update inspection data originally stored by the inspection robot, and after the update, perform inspection by the inspection robot according to the updated inspection data, wherein the inspection data at least includes an inspection route, coordinates of the detection site, and detection items of the detection site.

7. The Industrial Internet of Things system for inspection data processing of claim 1, wherein the identification information of the detection site at least includes number information of the detection site and number information of the current inspection robot.

8. A control method of an Industrial Internet of Things for inspection data processing, the Industrial Internet of Things for inspection data processing comprising a user platform, a service platform, a management platform, a sensor network platform, and an object platform interacted sequentially from top to bottom, wherein the service platform and the sensor network platform adopt an independent layout, and the management platform adopts a front sub platform layout; the independent layout means that the service platform or the sensor network platform is provided with a plurality of independent sub platforms, the plurality of independent sub platforms respectively store, process, and/or transmit data of different lower platforms; the front sub platform layout means that the management platform is provided with a general platform and a plurality of sub platforms, the plurality of sub platforms respectively store and process the data of different types or different receiving objects sent by the different lower platforms, and the general platform stores and processes data of the plurality of sub platforms after summarizing, and transmits the data of the plurality of sub platforms to upper platforms; the object platform is configured as an inspection robot in an intelligent production line;

the control method comprises:

when the inspection robot inspects a detection site, obtaining detection data of equipment or environment corresponding to the detection site, associating identification information of the detection site with the detection data, packing the associated detection data into a detection package, and sending the detection package to a sub platform of the sensor network platform corresponding to the detection site; and receiving, by the corresponding sub platform of the sensor network platform, the detection package, converting the detection package into a data file recognized by the management platform, and sending the data file to a sub platform of the management platform corresponding to the detection site;

receiving, by the corresponding sub platform of the management platform, the data file, extracting the detection data in the data file for comparison, obtaining a comparison result, storing identification information of the detection site, the detection data, and the comparison result, and uploading the identification information of the detection site, the detection data, and the comparison result as a corresponding data of the sub platform of the management platform to the general platform of the management platform;

after receiving the corresponding data of the sub platform of the management platform, based on the comparison result, sending, by the general platform of the management platform, feedback instructions to corresponding sub platform of the management platform, sending, by the corresponding sub platform of the management platform, the feedback instructions to the inspection robot through the corresponding sub platform of the sensor network platform, and the inspection robot continuing to perform detection after receiving the feedback instructions before moving to a next detection site; or sending, by the general platform of the management platform, the identification information of the detection site, the detection data, and the comparison result to the corresponding sub platform of the service platform; receiving, by the corresponding sub platform of the service platform, the identification information of the detection site, the detection data, and the comparison result and sending the identification information of the detection site, the detection data, and the comparison result to the user platform, and sending, by the user platform, based on the identification information of the detection site, the detection data, and the comparison result, processing instructions to the corresponding sub platform of the service platform, the general platform of the management platform, the corresponding sub platform of the management platform, and the corresponding sub platform of the sensor network platform; and receiving, by the corresponding sub platform of the sensor network platform, the processing instructions and converting the processing instructions into an instruction file recognized by the inspection robot, and the inspection robot receiving the instruction file and performing a corresponding move and detection operations, wherein the method further comprises:

when the inspection robot performs inspection and the user platform sends detection instructions of a specified detection site, obtaining, by the general platform of the management platform, latest detection site information of the inspection robot based on the stored identification information of the detection site, taking next two detection sites of a detection site corresponding to the detection site information as target objects, and sending the detection instruction of the specified detection site to sub platforms of the sensor network platform corresponding to the target objects; and when the inspection robot inspects any one of the target objects, receiving, by the general platform of the management platform, the detection instruction of specified detection site, interrupting the detection, moving to the specified detection site for detection, and returning to the interrupted detection site to continue the detection after the detection for the specified detection site is completed.

* * * * *